Patent

United States Patent [19]
Goyen

[11] 4,376,523
[45] Mar. 15, 1983

[54] HEADER AND VALVING ASSEMBLY

[76] Inventor: Albert H. Goyen, 17 Marie Dodd Crescent Lakehurst, Sydney, Australia

[21] Appl. No.: 259,086

[22] Filed: Apr. 30, 1981

[51] Int. Cl.³ ............... F16K 31/126; F16K 31/128; F16K 7/17
[52] U.S. Cl. .................................... 251/61.1; 251/145
[58] Field of Search ............... 251/145, 146, 147, 61.1

[56] References Cited
U.S. PATENT DOCUMENTS

| | | | |
|---|---|---|---|
| 2,715,418 | 8/1955 | van Derbeck | 251/61.1 X |
| 3,078,066 | 2/1963 | Moore | 251/61.1 |
| 3,856,046 | 12/1974 | Brown et al. | 251/61.1 X |
| 4,033,732 | 7/1977 | Axelsson et al. | 251/61.1 X |

FOREIGN PATENT DOCUMENTS 478972  2/1975  Australia .

Primary Examiner—Arnold Rosenthal
Attorney, Agent, or Firm—Donald D. Mon

[57] ABSTRACT

A header pipe has an external sealing surface. A diaphram type control valve is externally mounted to the header pipe. An outlet pipe is mounted to the header pipe, enters and crosses the flow passage in the header pipe, and has a threaded end. The body of the control valve has a skirt which bears against the sealing surface, and a tube which is threaded onto the threaded end of the outlet pipe to mount the valve and to bring the skirt against the sealing surface. A peripheral seal fits between the skirt and the sealing surface. It may be a cup-sectioned seal which is pressure-biased to form the seal.

9 Claims, 3 Drawing Figures ized. A typical

HEADER AND VALVING ASSEMBLY

FIELD OF THE INVENTION

This invention relates to headers equipped with externally mounted control valves for discharging fluid from the header to an outlet pipe.

BACKGROUND OF THE INVENTION

Especially in air-pulsing systems for dust collectors in which air from a header is periodically discharged against air filters for the purpose of cleaning them, the assembly of the header and valving assembly often is somewhat complicated, wasteful of space, and creates an undesirable restriction to fluid flow. For example in U.S. Pat. No. 4,033,732, issued July 5, 1977, there is shown a header with a outlet pipe passing through the header and terminating inside it at a control valve which also disposed inside the header pipe. The control valve is operated to release air from the header pipe into the outlet pipe, but its installation inside the header is unduly difficult, and also the valve itself stands as an impediment to flow of fluid through the header.

It is an object of this invention to provide a header and valving assembly in which the valve can readily be mounted to the outside of the header pipe where it will not constitute an impediment to flow, and where it can be easily sealed without the use of hold-down screws and the like which themselves require sealing. Thus it is an object of this invention to provide an easily mounted and effective valving system for a header.

BRIEF DESCRIPTION OF THE INVENTION

This invention is accomplished in combination with a header pipe having an internal flow passage and a wall with an external sealing surface. An aperture passes through the sealing surface into the flow passage. An outlet pipe is mounted to and passes through the wall and has a threaded end. A diaphragm-type valve has a body which includes a peripheral skirt that is adapted to bear against the sealing surface and has a web, and a threaded tubular member supported by the web that is threadedly engaged to the end of the outlet pipe and is operative to bring the skirt toward and against the sealing surface thereby to mount the diaphragm pipe valve to the header pipe. The web provides for a fluid passage extending between the flow passage in the header pipe and the outlet pipe. The control valve includes a valve seat and valving diaphragm in fluid-controlling position between the end of the outlet pipe and the fluid passage. Peripheral seal means is disposed between the skirt and the sealing surface.

According to a preferred but optional feature of the invention, the seal means is a cup-sectioned seal, and means is provided to apply pressurized fluid to the seal to press it into sealing relationship between the sealing surface and the skirt.

The above and other features of this invention will be fully understood from the following detailed description and the accompanying drawings, in which:

DETAILED DESCRIPTION OF THE INVENTION

Figure 1:
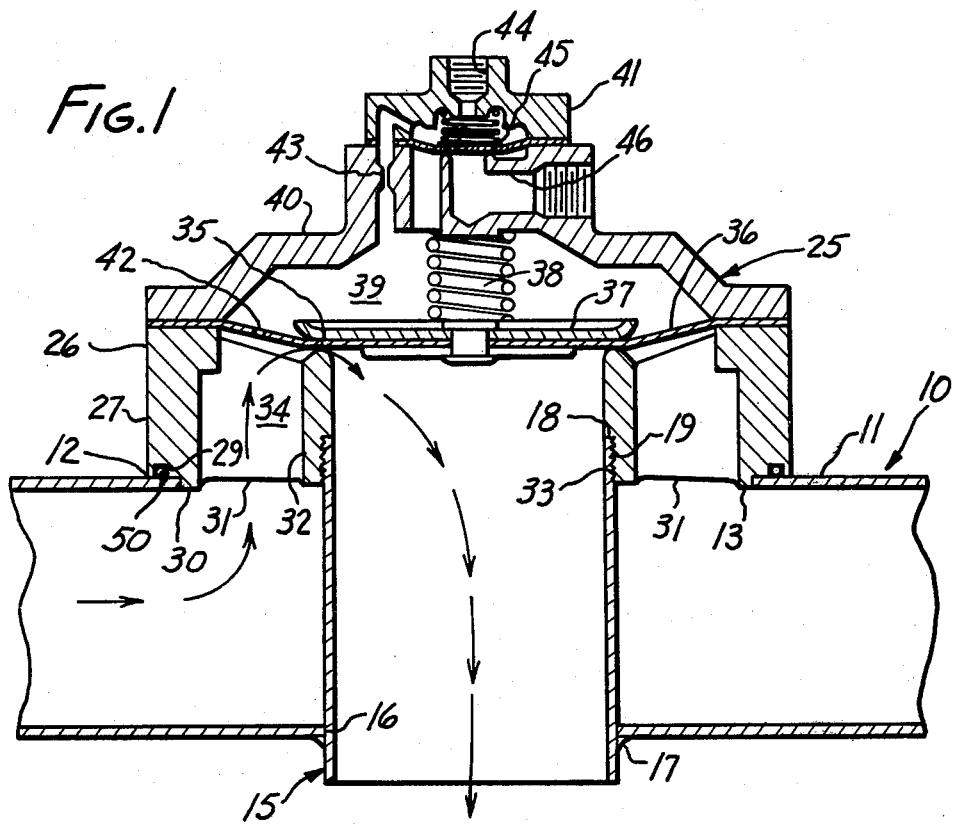
FIG. 1 is an axial cross-section showing the presently preferred embodiment of the invention.

In FIG. 1 a header pipe 10 is shown which is preferably square. Because header pipes for use in dust collector systems will often be quite large, say 12" by 12", there may be considerable deviations from strict squareness caused by the welding procedures used in assembly. Also it may be desired instead to provide cylindrical headers with localized area for mounting the valves as will later be described. In any event, the header pipe includes a wall 11 that has a peripheral sealing surface 12 with an aperture 13 therethrough. Sealing surface 12 is preferably flat and reasonably smooth for sealing purposes as will later be described.

An outlet pipe 15 passes through a hole 16 in wall 11 and is rigidly mounted to wall 11 by a weld 17. It crosses the flow passage in the header, and has a end 18 with an external thread 19 thereon. As shown, the thread preferably extends beyond the farthest wall of the header pipe from which it is attached. A typical outlet pipe diameter is 3".

A diaphragm-type control valve 25 is mounted to the threaded end of the outlet pipe. Valve 25 includes a body 26 that has a continuous peripheral skirt 27, the skirt having a face 28 that is brought against sealing surface 12. A ring groove 29 is formed around the entire periphery of face 28. A lip 30 is provided to assist in locating the valve body at the aperture.

A web 31 comprising three or four radially extending members mounts a central tube 32 which has an internal thread 33. Thread 33 is threaded onto thread 19 for the purpose of drawing the skirt toward and against the sealing surface, and thereby mounts the valve to the header pipe. The web forms a fluid passage 34 extending from the header to the workings of the valve itself. A valve seat 35 is formed on the top of the tube. It will generally be circular and rounded. A control diaphragm 36 supports a backing member 37, which backing member is biased by a spring 38 so as to press the control diaphragm against the valve seat for closing the valve. The position of the diaphragm will, of course, be a function of the difference between the pressure in the header and the pressure in the control chamber 39 which faces the upper side of the diaphragm. The body includes a cover portion 40 that has control means 41 for determining the pressure inside the control chamber. In some embodiments of the invention small apertures 42 will be provided in the diaphragm so that spring 38 can close the valve unless the control chamber is vented. Also the control means can include a bleed passage 43 or pilot passage 44 for use in controlling a second diaphragm type valve 45 which can lead to a source (not shown) of atmospheric or sub-atmospheric pressure via passage 46.

Figure 2:
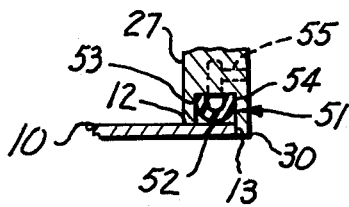
FIGS. 2 and 3 show two different types of seal means for use in the assembly of FIG. 1.

Seal means 50 is provided in ring groove 29 to seal between the skirt and the sealing surface on the header. The preferred embodiment is shown in FIG. 2, wherein a cup-sectioned seal 51 having a bottom 52 and two arms 53, 54 that are spaced apart from one another is seated with its flat bottom against the sealing surface. A pressure passage 55 extends from the upper portion of ring groove 29 to the inside of the skirt where it is exposed to header pressure, thereby tending to press the arms apart and the bottom downward to make a firm seal between the valve body and the header pipe. This can compensate for considerable unevenness in the sealing surface.

Figure 3:
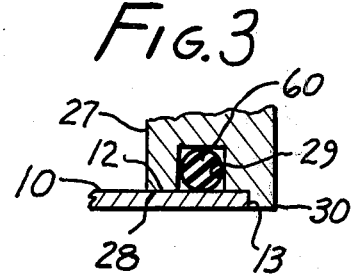

In FIG. 3 there is shown a simple O-ring 60 used as seal means 50, and it may or may not be pressurized. Generally an O-ring will rely on mechanical squeeze for its sealing operation.

The operation of the valve itself is of no particular importance to this invention, but its mounting is. The outlet pipe is mounted in the flow passage, where it forms an unavoidable obstruction to flow. However, the valve itself is outside of the header pipe and it does not form an impediment to flow. It is readily mounted and dismounted simply by use of the threads between the tube and the outlet pipe. The sealing surface can be made quite smooth so as to receive the seal, and of course it is a simple matter fo form the surfaces of the ring groove itself in a smooth and effective shape.

This invention thereby provides an easily mounted, readily sealed assembly which does not relay on holddown bolts and nuts (which themselves require sealing) and wherein the valve itself does not constitute an impediment to air flow through the header.

This invention is not to be limited by the embodiments shown in the drawings and described in the description which are given by way of example and not of limitation, but only in accordance with the scope of the appended claims.

I claim:

1. In combination: a header pipe having an internal flow passage, a wall with a sealing surface, and an aperture through said sealing surface into said flow passage;

an outlet pipe mounted to and passing through said wall, crossing said flow passage and having a threaded end;

a diaphragm-type valve having a body which includes a peripheral skirt adapted to bear against said sealing surface, a web, a threaded tubular member supported by said web threadedly engaged to the said end of said outlet pipe and operative to bring said skirt toward and against said sealing surface, thereby to mount said diaphragm-type valve to said header pipe, said web providing a fluid passage extending between said flow passage and said outlet pipe, said diaphragm-type valves being disposed outside of said header pipe, a valve seat and a valving diaphragm in said body in fluid controlling position between said end of said outlet pipe and said fluid passage, and port means for admitting control pressure to said diaphragm; and peripheral seal means disposed and sealing between said skirt and said sealing surface.

2. A combination according to claim 1 in which said seal means in an O-ring.

3. A combination according to claim 1 in which said seal means is a cup-sectioned seal, and in which means is provided to apply pressurized fluid to said seal to press it into sealing relationship between said sealing surface and said skirt.

4. A combination according to claim 1 in which said header pipe is substantially square.

5. A combination according to claim 4 in which said seal means is an O-ring.

6. A combination according to claim 4 in which said seal means is a cup-sectioned seal, and in which means is provided to apply pressurized fluid to said seal to press it into sealing relationship between said sealing surface and said skirt.

7. A combination according to claim 1 in which said valve seat is circular, and said diaphragm overlays it.

8. A combination according to claim 7 in which said seal means is a cup-sectioned seal, and in which means is provided to apply pressurized fluid to said seal to press it into sealing relationship between said sealing surface and said skirt.

9. A combination according to claim 8 in which said header pipe is substantially square.

* * * * *